United States Patent [19]
Wolff et al.

[11] 3,912,756
[45] Oct. 14, 1975

[54] NEW PHENOXYALKYL-CARBOXYLIC ACID COMPOUNDS AND THERAPEUTIC COMPOSITIONS

[75] Inventors: Hans Peter Wolff; Ernst-Christian Witte, both of Mannheim; Kurt Stach, Mannheim-Waldhof; Harald Stork, Mannheim-Feudenheim; Egon Roesch, Lampertheim, all of Germany

[73] Assignee: Boehringer Mannheim G.m.b.H., Mannheim-Waldhof, Germany

[22] Filed: Mar. 11, 1974

[21] Appl. No.: 450,254

[30] Foreign Application Priority Data
Apr. 21, 1973 Germany.............................. 2320387

[52] U.S. Cl.................. 260/326.13 R; 260/287 R; 260/295.5 A; 260/302 R; 260/307 H; 260/310 R; 260/332.2 C; 424/266; 424/270; 424/273; 424/274; 424/258; 424/275
[51] Int. Cl.²............. C07D 209/18; C07D 213/56; C07D 231/14
[58] Field of Search........................... 260/326.13 R Primary Examiner—Lewis Gotts
Assistant Examiner—S. P. Williams
Attorney, Agent, or Firm—Burgess, Dinklage & Sprung

[57] ABSTRACT

Novel phenoxyalkyl-carboxylic acid derivatives of the formula

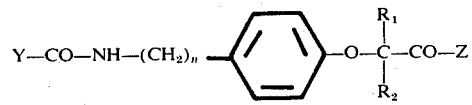

wherein
$R_1$ and $R_2$, which may be the same or different, are hydrogen or methyl;
$n$ is 1 or 2;
Z is hydroxyl or alkoxy; and
Y is a 5- or 6-membered heterocyclic ring containing, as hetero atoms, 1 or 2 sulfur, oxygen or nitrogen atoms, which heterocyclic ring may be substituted by halogen atoms or lower alkyl, alkoxy or alkoxyalkoxy radicals and may also contain a fused benzene nucleus, which can be substituted by halogen atoms or alkoxy or an alkylene radical;
and the pharmocologically compatible salts thereof, are outstandingly effective as serum lipid depressants and are thus effective therapeutic agents in the treatment of atherosclerosis.

10 Claims, No Drawings

NEW PHENOXYALKYL-CARBOXYLIC ACID COMPOUNDS AND THERAPEUTIC COMPOSITIONS

The present invention is concerned with the new phenoxyalkyl-carboxylic acid compounds, with therapeutic compositions containing them, and with therapeutic uses thereof.

The new phenoxyalkyl-carboxylic acid derivatives according to the present invention are compounds of the formula

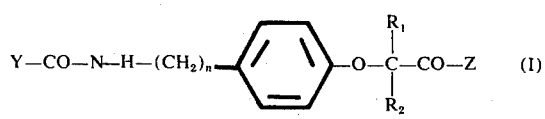

wherein
$R_1$ and $R_2$, which may be the same or different, are hydrogen or methyl;
$n$ is 1 or 2;
Z is hydroxyl or alkoxy; and
Y is a 5- or 6-membered heterocyclic ring containing, as hetero atoms, 1 or 2 sulfur, oxygen or nitrogen atoms, which heterocyclic ring may be substituted by halogen atoms or lower alkyl, alkoxy or alkoxyalkoxy radicals and may also contain a fused benzene nucleus, which can be substituted by halogen atoms or alkoxy or an alkylene radical;
and the pharmocologically compatible salts thereof.

The lower alkyl, alkoxy, or alkylene radicals can contain 1 to 6 and preferably 1 to 3 carbon atoms and the halogen is preferably Cl or Br.

The new compounds (I) according to the present invention, as well as the pharmacologically compatible salts thereof, show, in animal experiments, a strong depressing action on the serum lipid level, without undesired side effects thereby occurring. Consequently, the new compounds (I) according to the present invention and the salts thereof are effective medicaments against atherosclerosis. They are also valuable intermediates for the preparation of antibiotics with a $\beta$-lactam structure.

The new compounds according to the present invention can be prepared, for example, by reacting in known manner an amine of the general formula:

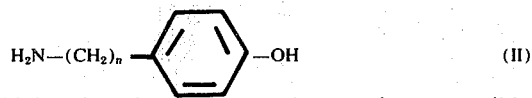

in which $n$ has the same meaning as above, possibly with intermediate protection of the amino or hydroxyl group, with an acid of the general formula:

in which Y has the same meaning as above, or with a reactive derivative thereof, and with a compound of the general formula:

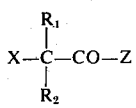

in which $R_1$, $R_2$ and Z have the same meanings as above and X is a reactive group, whereafter, subsequent to the condensation, the substituent Z is introduced or changed in known manner (i.e. if Z in the product obtained is a hydroxyl group, the product can be appropriately esterified and if Z in thhe product obtained is an alkoxy radical, the product can be saponified to the free acid or can be appropriately transesterified) and, if desired, the product obtained is converted into a pharmacologically compatible salt.

In carrying out the process according to the present invention, all three reaction components can, if desired, be reacted together simultaneously; however, it is preferable to carry out the reaction in two steps. The condensation of a compound of general formula (II) with compounds of general formulae (III) and (IV) is preferably carried out in such a manner that the first one of the two reactive groups of the compound (II) is blocked with a protective group which can easily be split off, the compound thus obtained is reacted with one of the compounds (III) or (IV), the protective group is removed and the reactive intermediate thus obtained is then reacted with the compound (IV) or (III) not previously used.

As reactive derivatives of the compound (III), there are preferably used the halides, anhydrides, mixed carboxylic acid carbonic acid anhydrides or imidazolides of appropriately substituted heterocyclic carboxylic acids which can be reacted, for example, under the conditions of the Schotten-Baumann reaction, i.e. with the addition of a tertiary amine, for example, pyridine, dimethyl aniline or triethylamine, in an inert solvent, with the compound (II). As inert solvent, it is preferable to use tetrahydrofuran, dioxan or an excess of the tertiary amine. It is also preferred to block the phenolic hydroxyl group by esterification or, more preferably, by etherification with a compound of general formula (IV).

On the other hand, a reactive derivative of a compound (II) can be reacted with a carboxylic acid of general formula (III). As reactive derivatives of compounds (II), there may be mentioned, by way of example, the phosphorus azoamides, which are formed in situ when to a solution of the compound (II), the hydroxyl group of which is protected, there is added a phosphorus trihalide, for example, phosphorus trichloride. As solvent and, simultaneously, as acid acceptor, there can be used a tertiary amine, for example pyridine. If this reaction is carried out in the presence of a carboxylic acid (III), then the desired amide with a protected hydroxyl function is obtained directly.

For a primary reaction of a compound (II) with a compound (IV), it has proved to be advantageous first to convert the amino group of the compound (II) into a protected group, for example a phthalimide group, which, after the reaction, can easily be split off again, for example with hydrazine or hydroxylamine. For the protection of the amino group, there can also be introduced other groups known from peptide chemistry for the protection of amino groups which, after the reaction, are again split off. It is preferred to block the amino group by an acyl group, for example, a formyl or acetyl group, which, after the reaction, can easily be split off again with a strong base, for example sodium hydroxide or potassium hydroxide.

As reactive compounds (IV), there are especially preferred those in which X is the anion of a strong acid, for example, of a hydrohalic or sulfonic acid. The reaction can be promoted by converting the phenolic hydroxyl group of the compound (II) into a phenolate, for example by reaction with a sodium alcoholate. The reaction of the two components can be carried out in a solvent, for example, in toluene, a xylene, methyl ethyl ketone or dimethyl formamide, preferably at an elevated temperature.

By saponification of the esters according to the present invention with mineral acids or with alkali metal hydroxides in a polar solvent, for example in an alkanol or water, the corresponding acids are obtained. The saponification is advantageously carried out with a strong base, for example, sodium or potassium hydroxide, in a mixture of methanol and water at a moderately elevated temperature.

For the preparation of salts with pharmacologically compatible organic or inorganic bases, for example sodium hydroxide, potassium hydroxide, calcium hydroxide, ammonium hydroxide, methyl-glucamine, morpholine or ethanolamine, the carboxylic acids are reacted with the appropriate bases. Mixtures of the carboxylic acids can also be reacted with an appropriate alkali metal carbonate or bicarbonate.

For the preparation of pharmaceutical compositions, at least one of the new compounds according to the present invention is mixed in the usual manner with an appropriate pharmaceutical carrier or diluent and optionally with odoriferous, flavoring and/or coloring materials and formed, for example, into tablets or dragees or, with the addition of appropriate adjuvants, suspended or dissolved in water or an oil, for example olive oil.

The compounds (I) can be administered orally or parenterally in liquid or solid form. As injection medium, it is preferred to use water which contains the stabilizing agents, solubilizing agents and/or buffers conventional for injection solutions. Additives of this kind include, for example, tartrate and borate buffers, ethanol, dimethyl sulfoxide, complex-forming agents (for example ethylene-diamine-tetraacetic acid), high molecular weight polymers (for example liquid polyethylene oxide) for viscosity regulation or polyoxyethylene derivatives of sorbite anhydrides.

Solid carrier materials include, for example, starch, lactose, mannitol, methyl cellulose, talc, highly-dispersed silicic acid, high molecular weight fatty acids (for example stearic acid), gelatine, agar-agar, calcium phosphate, magnesium stearate, animal and vegetable fats or solid high molecular weight polymers (for example polyethylene glycols). Compositions suitable for oral administration can, if desired, contain flavoring and/or sweetening agents. For external application, the compounds (I) according to the present invention can also be used in the form of powders and salves; for this purpose, they are admixed with, for example, powdered, physiologically compatible diluents or with conventional salve bases.

The following Examples are given for the purpose of illustrating the present invention.

EXAMPLE 1

Preparation of Ethyl 4-(3-methylisoxazol-5-ylcarbonylaminomethyl)-phenoxyacetate.

To a mixture of 80.3 g. (0.51 mol) p-hydroxybenzylamine hydrochloride, 75.9 g. (0.51 mol) calcined potassium carbonate and 670 ml. anhydrous pyridine, there were added, while stirring and with the exclusion of moisture, 151.3 g. (1.03 mol) 3-methylisoxazole-5-carbonyl chloride over the course of 15 minutes. The solution, which warmed up the addition of the acid chloride, was subsequently heated from 15 minutes at 100°C. for the completion of the reaction, then cooled to 70°C. and poured, while stirring, into 2.5 liters of an ice-water mixture. The suspension thus obtained was mixed with dilute hydrochloric acid until acidic, then filtered with suction, washed with water and an aqueous solution of sodium bicarbonate, dried and recrystallized from acetone. There were obtained 79.7 g. (53% of theory) 4-(3-methylisoxazol-5-ylcarbonylamino-methyl)-phenyl 3-methylisoxazole-5-carboxylate; m.p. 199° – 200°C.

To 78.0 g. (0.228 mol) 4-(3-methylisoxazol-5-ylcarbonylaminomethyl)-phenyl 3-methylisoxazole-5-carboxylate in 300 ml. methanol were added 456 ml. 1N aqueous potassium hydroxide solution, whereafter the clear solution obtained was warmed at 40°C. for 1.5 hours. After cooling, 456 ml. 1N hydrochloric acid were added, the reaction mixture was then freed from methanol in a vacuum and the precipitate obtained was filtered off with suction. For the removal of the 3-methylisoxazole-5-carboxylic acid, the precipitate was digested with a copious amount of aqueous sodium bicarbonate solution and thereafter washed with water. After recrystallization from isopropanol, there was obtained 52.0 g. (98% of theory) 4-(3-methylisoxazol-5-ylcarbonylaminomethyl)-phenol; m.p. 142° – 143°C.

23.2 g. (0.1 mol) 4-(3-methylisoxazol-5-ylcarbonylaminomethyl)-phenol were heated under reflux for 2 hours, while stirring and with the exclusion of moisture, with 27.6 g. (0.2 mol) calcined potassium carbonate in 300 ml. methyl ethyl ketone. The reaction mixture was then cooled, 20.0 g. (0.12 mol) ethyl bromacetate, as well as a spatula tip of potassium iodide, were added thereto and the reaction mixture was again heated under reflux for 7 hours. The solid material on the bottom of the reaction vessel used was filtered off and thoroughly washed with acetone. The combined filtrates were evaporated in a vacuum. The crystalline residue was recrystallized from isopropanol, 20.3 g. (64% of theory) ethyl 4-(3-methylisoxazol-5-ylcarbonylaminomethyl)-phenoxyacetate thereby being obtained; m.p. 102°C.

The following compounds are prepared in an analogous manner:

a. Ethyl 4-(thien-2-ylcarbonylaminomethyl)-phenoxyacetate yield 90% of theory; m.p. 106° – 108°C. (recrystallized from isopropanol), from p-hydroxybenzylamine and thiophene-2-carbonyl chloride, via the following intermediate stages: 4-(thien-2-ylcarbonylaminomethyl)-phenyl thiophene-2-carboxylate; yield 100% of theory, m.p. 128° – 130°C. (recrystallized from isopropanol); 4-(thien-2-ylcarbonylaminomethyl)-phenol; yield 72% of theory; m.p. 191° – 192°C. (recrystallized from ethanol);

b. Ethyl 4-(1,3-dimethylpyrazol-5-ylcarbonylaminomethyl)-phenoxyacetate yield 30% of theory, m.p. 76° – 77°C. (recrystallized from isopropanol/ligroin), from p-hydroxybenzylamine and 1,-3-dimethylpyrazol-5-ylcarbonyl chloride via the following intermediate stages: 4-(1,3-dimethylpyrazol-5-ylcarbonylaminomethyl)-phenyl 1,3-dimethylpyrazole-5-carboxylate; yield 52% of theory; m.p. 112° – 114°C.

(recrystallized from isopropanol); 4-(1,3-dimethylpyrazol-5-ylcarbonylaminomethyl)-phenol; yield 70% of theory; m.p. 176° – 178°C. (recrystallized from isopropanol.

EXAMPLE 2

Preparation of Ethyl 4-[2-(3-methylisoxazol-5-ylcarbonylamino)-ethyl]-phenoxyacetate.

To 54.8 g. (0.4 mol) tyramine in 200 ml. anhydrous pyridine, there were added, while stirring and with the exclusion of moisture, 120 g. (0.82 mol) 3-methylisoxazole-5-carbonyl chloride over the course of 15 minutes, the temperature thereby increasing spontaneously. The reaction mixture was subsequently heated to 100°C. for 15 minutes, cooled somewhat and, while still warm, poured into ice water. The pH was now adjusted to 4 with hydrochloric acid and the precipitate thus obtained was filtered off with suction, digested with aqueous sodium bicarbonate solution for the removal of 3-methylisoxazole-5-carboxylic acid and again filtered with suction. The filter cake was subsequently recrystallized from acetone. There were obtained 94.1 g. (64% of theory) N,O-di-(3-methylisoxazol-5-yl-carbonyl)-tyramine; m.p. 187° – 188°C.

92 g. (0.26 mol) N,O-di-(3-methylisoxazol-5-ylcarbonyl)-tyramine were dissolved in 2.5 liters acetone, saponified with aqueous potassium hydroxide solution in the manner described in Example 1 and the product obtained recrystallized from isopropanol. There were obtained 52.4 g. (86% of theory) 4-[2-(3-methylisoxazol-5-ylcarbonylamino)-ethyl]-phenol; m.p. 147° – 148°C.

By the reaction of 14.8 g. (60 mMol) 4-[2-(3-methylisoxazol-5-ylcarbonylamino)-ethyl]-phenol with ethyl bromoacetate in methyl ethyl ketone in the manner described in Example 1, there was obtained, in a yield of 58% of theory, ethyl 4-[2-(3-methylisoxazol-5-ylcarbonylamino)-ethyl]-phenoxyacetate which, after recrystallization from isopropanol, melted at 104° – 106°C.

The following compounds are obtained in an analogous manner:

a. Ethyl 4-[2-(thien-2-ylcarbonylamino)-ethyl]-phenoxyacetate yield 95% of theory; m.p. 114° – 116°C. (recrystallized from isopropanol), from tyramine and thiophene-2-carbonyl chloride via the following intermediate stages: N,O-di-(thien-2-ylcarbonyl)-tyramine, quantitative yield, m.p. 137° – 139°C. (recrystallized from ethanol); N-(thien-2-ylcarbonyl)-tyramine, yield 79% of theory, m.p. 143° – 145°C. (recrystallized from ethanol);

b. Ethyl 4-[2-(1,3-dimethylpyrazole-5-ylcarbonylamino)-ethyl]-phenoxyacetate yield 58% of theory, m.p. 62° – 63°C. (recrystallized from ether) from tyramine and 1,3-dimethylpyrazole-5-carbonyl chloride via the following intermediate stages: N,O-di(1,3-dimethylpyrazol-5-ylcarbonyl)-tyramine, quantitative yield, m.p. 121° – 122°C.; N-(1,3-dimethylpyrazol-5-ylcarbonyl)-tyramine, yield 53% of theory, m.p. 184° – 185°C. (recrystallized from ethanol/water).

The reaction of 4-[2-(3-methylisoxazol-5-ylcarbonylamino)-ethyl]-phenol with ethyl bromoacetate can also be carried out in a non-polar solvent.

Into a solution of 1.34 g. (57 mg. atom) sodium in 50 ml. absolute ethanol, there were introduced 14.1 g. (57 mMol 4-[2-(3-methylisoxazol-5-ylcarbonylamino)-ethyl]-phenol. The reaction mixture was then heated under reflux for 10 minutes, the alcohol was evaporated off and the residue was freed from residual solvent in a vacuum, using benzene as an entraining agent. The phenolate thus obtained was suspended in 100 ml. anhydrous toluene. To this were added 14.2 g. (85 mMol)ethyl bromoacetate, the suspension was stirred for 15 hours at 80°C., with the exclusion of moisture, the inorganic precipitate was filtered off and the filtrate was evaporated in a vacuum. The residue was taken up in methylene chloride, successively washed with dilute aqueous sodium hydroxide solution, with hydrochloric acid and with water, dried over anhydrous sodium sulfate and then evaporated. After recrystallization from isopropanol, there were obtained 10.0 g. (52% of theory) ethyl 4-[2-(3-methylisoxazol-5-ylcarbonylamino)-ethyl]-phenoxyacetate; m.p. 104° – 106°C.

EXAMPLE 3

Preparation of Ethyl 2-[4-(3-methylisoxazol-5-ylcarbonylaminomethyl)-phenoxy]-2-methylpropionate.

27.8 g. (0.12 mol) 4-(3-methylisoxazol-5-ylcarbonylaminomethyl)-phenol (cf. Example 1) were heated under reflux for 2 hours with 33.1 g. (0.24 mol) calcined potassium carbonate in 250 ml. anhydrous methyl ethyl ketone, while stirring and with the exclusion of moisture. 24.8 g. (0.18 mol) ethyl α-bromoisobutyrate and some potassium iodide were then added thereto and the reaction mixture further heated under reflux for 24 hours. Thereafter, 12.4 g. (0.09 mol) ethyl α-bromoisobutyrate and 16.5 g. (0.12 mol) potassium carbonate were added thereto. The reaction mixture was again maintained under reflux for 24 hours and, after cooling, a further 16.5 g. (0.12 mol) potassium carbonate and 12.4 g. (0.09 mol) ethyl α-bromoisobutyrate were added thereto. This mixture was finally stirred under reflux for 42 hours. The solid material which settled out on the bottom of the reaction vessel used was filtered off, taken up in water and extracted with chloroform. The chloroform extracts were combined with the filtrate and evaporated in a vacuum. The residue was taken up in chloroform or ether, unreacted phenol was extracted with 0.5N aqueous sodium hydroxide solution and the organic phase was washed with water, dried and evaporated in a vacuum. The crystalline residue was recrystallized from isopropanol. There were obtained 22.5 g. (57% of theory) ethyl 2-[4-(3-methylisoxazol-5-ylcarbonylaminomethyl)-phenoxy]-2-methylpropionate; m.p. 79° – 80°C.

The following compounds were obtained in an analogous manner:

a. Ethyl 2-[4-(thien-2-ylcarbonylaminomethyl)-phenoxy]-2-methyl-propionate from 4-(thien-2-ylcarbonylaminomethyl)-phenol and ethyl α-bromoisobutyrate; yield 64% of theory, m.p. 77° – 80°C. (recrystallized from isopropanol);

b. Ethyl 2-[4-(1,3-dimethylpyrazol-5-ylcarbonylaminomethyl)-phenoxy]-2-methyl-propionate from 4-(1,3-dimethylpyrazole-5-ylcarbonylaminomethyl)-phenol and ethyl α-bromoisobutyrate; yield 85% of theory, m.p. 81° – 83°C. (recrystallized from ligroin/ethyl acetate);

c. Ethyl 2-[4-(pyrid-3-ylcarbonylaminomethyl)-phenoxy]-2-methyl-propionate from 4-(pyrid-3- ylcarbonylamino-methyl)-phenol and ethyl 60-bromoisobutyrate; yield 86% of theory, m.p. 62° – 63°C. (recrystallized from ethyl acetate/ligroin).

The starting compound, 4-(pyrid-3-ylcarbonylaminomethyl)-phenol, was prepared in the following manner:

In a manner analogous to that described in Example 1, nicotinoyl chloride was reacted with p-hydroxybenzylamine to give 4-(pyrid-3-ylcarbonylaminomethyl)-phenyl nicotinate in a yield of 78% of theory; m.p. 137° – 138°C. By subsequent hydrolysis with aqueous potassium hydroxide solution, this was converted into 4-(pyrid-3-ylcarbonylaminomethyl)-phenol in a yield of 71% of theory; m.p. 177° – 179°C.

d. Ethyl 2- 4-[2-(3-methylisoxazol-5-ylcarbonylamino)-ethyl]-phenoxy -2-methyl-propionate from N-(3-methylisoxazol-5-ylcarbonyl)-tyramine and ethyl α-bromoisobutyrate, yield 65% of theory; m.p. 89° – 90°C.

e. Ethyl 2- 4-[2-(thien-2-ylcarbonylamino)-ethyl]-phenoxy -2-methyl-propionate from N-(thien-2-ylcarbonyl)-tyramine and ethyl α-bromoisobutyrate; yield 59% of theory, m.p. 88° – 90°C. (recrystallized from benzene/ligroin).

f. Ethyl 2- 4-[2-(1,3-dimethylpyrazol-5-ylcarbonylamino)-ethyl]-phenoxy -2-methyl-propionate from N-(1,3-dimethyl-pyrazol-5-ylcarbonyl)-tyramine and ethyl α-bromoisobutyrate; yield 54% of theory; colorless oil; $n_D^{20}$ 1.5293.

g. Ethyl 2- 4-[2-(pyrid-3-ylcarbonylamino)-ethyl]-phenoxy -2-methyl-propionate from N-(pyrid-3-ylcarbonyl)-tyramine and ethyl α-bromoisobutyrate; yield 51% of theory; m.p. 89° – 90°C. (recrystallized from ether/ligroin).

The starting compound, N-(pyrid-3-ylcarbonyl)-tyramine, was prepared in the following manner:

In a manner analogous to that described in Example 2, nicotinoyl chloride was reacted with tyramine to give, in a yield of 64% of theory, N,O,-di-(pyrid-3-ylcarbonyl)-tyramine; m.p. 136° – 140°C. (recrystalized from isopropanol). This was subsequently hydrolyzed with aqueous potassium hydroxide solution, in a manner analogous to that described in Example 2, to give, in a yield of 82% of theory, N-(pyrid-3-ylcarbonyl)-tyramine; m.p. 180° – 181°C. (recrystalized from isopropanol).

EXAMPLE 4

Preparation of Ethyl 4-(thiazol-5-ylcarbonylaminomethyl)-phenoxyacetate

To a solution of 159 g. (1.0 mol) p-hydroxybenzylamine in 1 liter anhydrous pyridine was added dropwise, while stirring and at 30° – 35°C., 160 g. (2.1 mol) acetyl chloride. The reaction mixture was subsequently heated on a boiling waterbath for 15 minutes, then cooled and poured into a mixture of ice and water. By the addition of concentrated hydrochloric acid, the reaction mixture was made distinctly acidic and then extracted with chloroform. The organic phase was washed with water, dried over anhydrous calcium chloride and evaporated in a vacuum. There was obtained a residue of 188.6 g. (91% of theory) 4-(acetamidomethyl)-phenyl acetate which, after recrystallization from ethyl acetate/ligroin, melted at 78° – 79°C.

180 g. (0.87 mol) 4-acetamidomethyl)-phenyl acetate were now dissolved in 1.3 liters methanol. 80.5 g. (1.74 mol) potassium hydroxide in 600 ml. water were added thereto dropwise and the reaction mixture was subsequently kept for 2 hours at an internal temperature of 50°C. It was then cooled, weakly acidified with concentrated hydrochloric acid and the methanol distilled off in a vacuum. The product which crystallizes out was filtered off with suction, thoroughly washed with water and dried. There were obtained 130 g. 4-(acetamidomethyl)-phenol (91% of theory) which, after recrystallization from isopropanol, melted at 132°C.

150 g. (0.91 mol) 4-(acetamidomethyl)-phenol and 251 g. (1.82 mol) anhydrous pulverized potassium carbonate were heated under reflux, while stirring, for 2 hours in 3 liters dry methyl ethyl ketone. 244 g. (1.46 mol) ethyl bromoacetate were then added thereto, together with 1 g. potassium iodide, and the reaction mixture again heated under reflux for 4 hours. The inorganic precipitate was filtered off, thereafter washed with acetone and the combined filtrate was evaporated in a vacuum. The crystalline slurry thus obtained was washed with ether and dried. There were obtained 211 g. (92% of theory) ethyl 4-(acetamidomethyl)-phenoxyacetate which, after recrystallization from isopropanol, melted at 91° – 92°C.

A solution of 125 g. (0.5 mol) ethyl 4-(acetamidomethyl)-phenoxyacetate in 725 ml. ethanol was mixed with a solution of 280 g. (5 mol) potassium hydroxide in 600 ml. water and heated under reflux for 14 hours. While cooling, the pH of the reaction mixture was then adjusted to 5.5 with concentrated hydrochloric acid, cooled considerably and, after some time, the precipitated crystals were filtered off with suction. These were washed with a copious amount of water and dried. 4-(Aminomethyl)-phenoxyacetic acid was obtained in quantitative yield; m.p. 230°C. (decomp.). The crude acid was recrystallized from ethanol/water and then had a melting point of 232°C. (decomp.). The hydrochloride thereof melted at 252° – 253°C. (decomp.). A solution of 89 g. (0.49 mol) of this carboxylic acid in 890 ml. absolute ethanol was saturated with dry gaseous hydrogen chloride, while stirring and with ice cooling, the hydrogen chloride being introduced at the surface of the solution. The reaction mixture was left to stand for 12 hours in a closed vessel. Subsequently, alcohol and excess hydrogen chloride were removed in a vacuum. The residue was recrystallized from ethanol. There were obtained 84.7 g. (70% of theory) ethyl 4-(aminomethyl)-phenoxyacetate hydrochloride; m.p. 190° – 191°C.

By the reaction of 0.1 mol ethyl 4-(aminomethyl)-phenoxyacetate hydrochloride with 0.1 mol thiazole-5-carbonyl chloride in a manner analogous to that described in Example 1, there was obtained ethyl 4-(thiazol-5-ylcarbonylaminomethyl)-phenoxy-acetate; yield 72% of theory; m.p. 120° – 121°C. (recrystallized from isopropanol).

The following compound was obtained in an analogous manner:

Ethyl 4-(pyrid-3-ylcarbonylaminomethyl)-phenoxyacetate from ethyl 4-(aminomethyl)-phenoxyacetate and nicotinoyl chloride; yield 73% of theory; m.p. 101° – 102°C. (recrystallized from isopropanol).

EXAMPLE 5

Preparation of Ethyl 4-[2-(thiazol-5-ylcarbonylamino)-ethyl]-phenoxyacetate

By the reaction of tyramine with acetyl chloride, subsequent hydrolysis and condensation with ethyl bromoacetate in a manner analogous to that described in Example 4, there was obtained, via the intermediate stages of N,O-diacetyltyramine (m.p. 98° – 100°C. ((recrystallized from benzene)), quantitative yield) and N-acetyltyramine (m.p. 130° – 132°C. ((recrystallized from ethyl acetate)), yield 74% of theory), ethyl 4-[2-(acetamido)-ethyl]-phenoxyacetate which, after recrystallization from ethyl acetate/ligroin, melted at 69° – 71°C.; yield 90% of theory.

The hydrolysis of ethyl 4-[2-(acetamido)-ethyl]-phenoxyacetate with a solution of potassium hydroxide in ethanol in a manner analogous to that described in Example 4 gives 4-(2-aminoethyl)-phenoxyacetic acid which, after recrystallization from ethanol-water, melted at 295°C.; yield 79% of theory. The hydrochloride of this amino acid melted, with decomposition, at 254°C. The ethyl ester was obtained in a manner analogous to that described in Example 4 by gasifying a solution of the acid in absolute ethanol with hydrogen chloride, the ester being obtained in the form of its hydrochloride in a yield of 54% of theory. After recrystallization from isopropanol, it had a melting point of 157° – 160°C.

By the reaction of ethyl 4-(2-aminoethyl)-phenoxyacetate hydrochloride with thiazole-5-carboxylic acid in a manner analogous to that described in Example 1, there was obtained ethyl 4-[2-(thiazol-5-ylcarbonylamino)-ethyl]-phenoxyacetate; yield 56% of theory; after recrystallization from ethyl acetate/ligroin, it has a melting point of 98° – 100°C.

The N-acetyltyramine used as intermediate can also be prepared directly from tyramine by the following method:

64.0 g. (0.466 mol) tyramine was reacted, while stirring, with 200 ml. acetic anhydride, a clear solution being formed, with spontaneous heating up. This solution was seeded with a few crystals of N-acetyltyramine, immediate crystallization thereby taking place. The reaction mixture was rapidly cooled, filtered off with suction, washed with ether and water and dried. There were obtained 59 g. (71% of theory) N-acetyltyramine, which has a melting point of 124° – 126°C. After recrystallization from ethyl acetate, it had a melting point of 129° – 131°C.

The following compound was obtained in an analogous manner:

Ethyl 4-[2-(pyrid-3-ylcarbonylamino)-ethyl]-phenoxyacetate from ethyl 4-(2-aminoethyl)-phenoxyacetate hydrochloride and nicotinoyl chloride; yield 53% of theory; m.p. 103° – 104°C. (recrystallized from ethyl acetate/ligroin).

EXAMPLE 6

Preparation of Ethyl 2-{4-[2-(thiazol-5-ylcarbonylamino)-ethyl]-phenoxy}-2-methyl-propionate A mixture of 89.6 g. (0.5 mol) N-acetyl-tyramine (cf. Example 5), 138 g. (1 mol) anhydrous pulverized potassium carbonate and 1.5 liters anhydrous methyl ethyl ketone was heated under reflux, while stirring, for 2 hours, then mixed with 146.3 g. (0.75 mol) ethyl α-bromoisobutyrate and 4 g. potassium iodide and again heated under reflux, while stirring. After 40 hours, 69 g. (0.5 mol) potassium carbonate and 73.2 g. (0.375 mol) ethyl α-bromoisobutyrate were added thereto and, after 9 total reaction time of 128 hours, the reaction mixture was worked up in the manner described in Example 4. There were obtained 119 g. (81% of theory) ethyl 2-{4-[2-(acetamido)-ethyl]-phenoxy}-2-methyl-propionate which, after recrystallization from ligroin-ethyl acetate, melted at 51° – 54°C.

In a manner analogous to that described in Example 4, from ethyl 2-{4-[2-(acetamido)-ethyl]-phenoxy}-2-methylpropionate there was obtained, by reaction with an aqueous alcoholic solution of potassium hydroxide, 2-[4-(2-amino-ethyl)-phenoxy]-2-methyl-propionic acid; yield 89% of theory; m.p. 284°C. (decomp.), after recrystallization from ethanol-water. The hydrochloride melted, with decomposition, at 216° – 217°C.

A solution of 58 g. (0.26 mol) of this carboxylic acid in 600 ml. absolute ethanol was saturated with dry gaseous hydrogen chloride, in the manner described in Example 4, then left to stand in a closed vessel and, after 12 hours, the ethanol and excess hydrogen chloride were evaporated off in a vacuum. Water was added to the residue, the solution obtained was extracted three times with ether and the aqueous phase was made distinctly alkaline and extracted several times with chloroform. The chloroform extract was washed with a little water, dried over anhydrous potassium carbonate and evaporated. By distillation of the residue, there were obtained, between 125 and 128°C./0.1 mm. Hg., 53.2 g. (82% of theory) colorless ethyl 2-[4-(2-aminoethyl)-phenoxy]-2-methyl-propionate.

By the reaction of 1 mol ethyl 2-[4-(2-aminoethyl)-phenoxy]-2-methyl-propionate with 1 mol thiazole-5-carbonyl chloride in a manner analogous to that described in Example 4, there was obtained ethyl 2-{4-[2-(thiazol-5-ylcarbonylamino)-ethyl]-phenoxy}-2-methyl-propionate; yield 70% of theory; m.p. 108°– 110°C., after recrystallization from isopropanol.

EXAMPLE 7

Preparation of Ethyl 2-[4-(thiazol-5-ylcarbonylaminomethyl)-phenoxy]-2-methyl-propionate By the reaction of 4-(acetamidomethyl)-phenol (cf. Example 4) with ethyl α-bromoisobutyrate in a manner analogous to that described in Example 6, there was obtained ethyl 2-[4-acetamidomethyl)-phenoxy]-2-methyl-propionate; yield 90% of theory. After recrystallization from ether-ligroin, the compound melted at 84°– 85°C. From this, there was obtained, in a manner analogous to that described in Example 4, using aqueous ethanolic potassium hydroxide solution, 2-[4-(aminomethyl)1phenoxy]-2-methyl-propionic acid; yield 84% of theory. After recrystallization from ethanol-water, the compound melted at 221°– 222°C. The corresponding hydrochloride melted, with decomposition, at 216°– 217°C.

2-[4-(Aminomethyl)-phenoxy]-2-methyl-propionic acid was, in a manner analogous to that described in Example 6, converted, by gasifying with hydrogen chloride in ethanol, into ethyl 2-[4-(aminomethyl)-phenoxy[-2-methyl-propionate. It had a boiling point of 113°– 120°C./0.06 mm.Hg.; yield 82% of theory.

The reaction of ethyl 2-[4-(aminomethyl)-phenoxy]-2-methyl-propionate with thiazole-5-carbonyl chloride in the manner described in Example 4 gave ethyl 2-[4-(thiazol-5-ylcarbonylaminomethyl)-phenoxy]-2-methyl-propionate which, after recrystallization from isopropanol, melted at 130°–132°C.; yield 76% of theory.

Ethyl 2-[4-(pyrid-3-ylcarbonylaminomethyl)-phenoxy]-2methyl-propionate was prepared in an analogous manner from ethyl 2-[4-(aminomethyl)-phenoxy]-2-methyl-propionate and nicotinoyl chloride. The yield was 86% of theory. After recrystallization from ethyl acetate-ligroin, the compound melted at 62°–63°C.

The mixed melting point with the compound prepared accordiing to Example 3c showed no depression.

EXAMPLE 8

Preparation of Ethyl 4-(3-methyl-pyrazol-5-ylcarbonylaminomethyl)-phenoxy-acetate From 20.8 g. (0.1 mol) ethyl 4-(aminomethyl)-phenoxyacetate hydrochloride in 150 ml. anhydrous dimethyl formamide was liberated the amino ester by adding, with stirring and ice cooling, 10.1 g. (0.1 mol) triethylamine. There were then added 10.8 g. (0.05 mol) of the diketopiperazine of 3-methyl-pyrazole-5-carboxylic acid (see C.A. Rojahn and H.E. Kuehling, Arch. Pharm., 264, 342/1920). The suspension was stirred for 2 hours at 60°C., a clear solution thereby being gradually formed. The solution was then evaporated, the oil remaining behind was poured into water and the crystals which precipitated were filtered off with suction. There were obtained 15.1 g. (48% of theory) ethyl 4-(3-methyl-pyrazol-5-ylcarbonylaminomethyl)-phenoxy-acetate; m.p. 123°C.

In an analogous manner, ethyl 4-[2-(3-methylpyrazol-5-ylcarbonylamino)-ethyl]-phenoxy-acetate was prepared from ethyl 4-(2-aminoethyl)-phenoxy-acetate hydrochloride and the diketopiperazine of 3-methyl-pyrazole-5-carboxylic acid in a yield of 73% of theory. After recrystallization from ethyl acetate, the compound melted at 113°–115°C.

EXAMPLE 9

Preparation of Ethyl 2-{4-[2-(3-methyl-pyrazol-5-ylcarbonylamino)-ethyl]-phenoxy}-2-methylpropionate A mixture of 8.63 g. (40 mMol) of the diketopiperazine of 3-methyl-pyrazole-5-carboxylic acid and 20.1 g. (80 mMol) ethyl 2-[4-(2-aminoethyl)-phenoxy]-2-methyl-propionate in 52 ml. anhydrous dimethyl formamide was maintained at 60°C. for 2 hours, while stirring. The solution obtained, which was finally clear, was evaporated in a vacuum, the oil remaining behind was stirred into water and the aqueous phase was extracted several times with ether. The ether phase was washed with water, dried and evaporated. The residue was recrystallized from ethyl acetate, with the addition of some ligroin. There were obtained 22.5 g. (78% of theory) ethyl 2-{4-[2-(3-methyl-pyrazol-5-ylcarbonylamino)-ethyl]-phenoxy } -2-methyl propionate; m.p. 92°–94°C.

In an analogous manner, ethyl 2-[4-(3-methylpyrazol-5-ylcarbonylaminomethyl)-phenoxy]-2-methyl-propionate was prepared from ethyl 2-[4-(aminomethyl)-phenoxy]-2-methyl-propionate and the diketo-piperazine of 3-methyl-pyrazole5-carboxylic acid; yield 68% of theory. The compound was a colorless oil; $n_D^{20} = 1.5371$.

EXAMPLE 10

Preparation of Ethyl 2- 4-[2-(5-methoxy-indol-2-ylcarbonylamino)-ethyl]-phenoxy -2-methylpropionate Into a solution of 20.1 g. (80 mMol) ethyl 2-[4-(2-aminoethyl)-phenoxy]-2-methyl-propionate and 15.3 g. (80 mMol) 5-methoxy-indole-2-carboxylic acid in 160 ml. anhydrous pyridine, there was slowly added dropwise, with stirring and ice cooling, a solution of 6.9 g. (50 mMol) phosphorus trichloride in 50 ml. pyridine and the reaction mixture then further stirred for 2 hours at 0°C. The reaction mixture was thereafter left to stand for 3 days in a refrigerator in a securely closed vessel. Thereafter, it was poured on to ice, rendered weakly acidic with hydrochloric acid and the crystals which precipitated out were filtered off. They were washed with dilute hydrochloric acid and then with water, dried and recrystallized from isopropanol. There were obtained 21.3 g. (68% of theory) ethyl 2-{4-[2-(5-methoxy-indol-2-ylcarbonylamino)-ethyl]-phenoxy}-2-methyl-propionate; m.p. 139°–141°C.

The following compounds were obtained in an analogous manner:

Ethyl 4-[2-(5-methoxy-indol-2-ylcarbonylaminoethyl]-phenoxyacetate from ethyl 4-(2-aminoethyl-phenoxyacetate hydrochloride and 5-methoxy-indole-2-carboxylic acid; yield 52% of theory; m.p. 157°–159°C., after recrystallization from ethyl acetate.

b. Ethyl 2-{4-[2-(5-chloroindol-2-ylcarbonylamino)-ethyl]-phenoxy}-2-methyl-propionate from ethyl 2-[4-(2-aminoethyl)-phenoxy]-2-methyl-propionate and 5-chlorindole-2-carboxylic acid; yield 40% of theory; m.p. 182°–183°C., after recrystallization from isopropanol.

c. Ethyl 2-[4-(5-methoxyindol-2-ylcarbonylaminomethyl)-phenoxy]-2-methyl-propionate from ethyl 2-[4-(aminomethyl)-phenoxy]-2-methyl-propionate and 5-methoxyindole-2-carboxylic acid; yield 68% of theory; m.p. 128°–129°C., after recrystallization from isopropanol.

d. Ethyl 4-(5-methoxyindol-2-ylcarbonylaminomethyl)-phenoxyacetate from ethyl 4-(aminomethyl)-phenoxyacetate hydrochloride and 5-methoxyindole-2-carboxylic acid; yield 44% of theory; m.p. 152°–153°C., after recrystallization from ethyl acetate.

EXAMPLE 11

Preparation of 4-93-Methylisoxazol-5-ylcarbonylaminomethyl)-phenoxy-acetic acid 15.6 g. (48 mMol) ethyl 4-(3-methylisoxazol-5-ylcarbonylaminomethyl)-phenoxyacetate (see Example 1) were dissolved in 200 ml. methanol and mixed at ambient temperature with 72 ml. 1N aqueous potassium hydroxide solution. The reaction mixture was kept at 40°C. for 2.5 hours and then, after cooling, neutralized with 72 ml. 1N hydrochloric acid, while cooling with ice. The precipitate obtained was filtered off with suction, washed with water and recrystallized from water. There were obtained 13.0 g. (93% of theory) 4-(3-methylisoxazol-5-ylcarbonylaminomethyl)- phenoxyacetic acid which melted, with decomposition, at 248°C.

The following compounds were obtained in an analogous manner:

2-[4-(3-methylisoxazol-5-ylcarbonylaminomethyl)-phenoxy]-2-methyl-propionic acid from ethyl 2-[4-(3-methylisoxazol-5-ylcarbonylaminomethyl)-phenoxy]-2-methylpropionate (see Example 3) yield 66% of theory; m.p. 152.5°C., after recrystallization from isopropanol;

4-[2-(3-methylisoxazol-5-ylcarbonylamino)-ethyl]-phenoxyacetic acid from ethyl 4-[2-(3-methylisoxazol-5-ylcarbonylamino)-ethyl]-phenoxyacetate (see Example 2); yield 61% of theory; m.p. 175°–176°C.;

2-{4-[2-(3-methylisoxazol-5-ylcarbonylamino)-ethyl]-phenoxy}-2-methylpropionic acid from ethyl 2-{4-[2-(3-methylisoxazol-5-ylcarbonylamino)-ethyl]-phenoxy}-2-methylpropionate (see Example 3d); yield 72% of theory; m.p. 132°–133°C., after recrystallization from isopropanol;

4-(thien-2-ylcarbonylaminomethyl)-phenoxyacetic acid from ethyl 4-(thien-2-ylcarbonylaminomethyl)-phenoxyacetate (see Example 1a); yield 65% of theory; m.p. 162°–163°C., after recrystallization from isopropanol;

2-(4-thien-2-ylcarbonylaminomethyl)-phenoxy]-2-methylpropionic acid from ethyl 2-[4-(thien-2-ylcarbonylaminomethyl)-phenoxy]-2-methylpropionate (see Example 3a); yield 62% of theory; m.p. 177°–178°C., after recrystallization from isopropanol;

4-[2-thien-2-ylcarbonylamino)-ethyl]-phenoxyacetic acid from ethyl 4-[2-(thien-2-ylcarbonylamino)-ethyl]-phenoxyacetate (see Example 2a); yield 87% of theory; m.p. 120°–124°C., after recrystallization from water;

2-{4-[2-(thien-2-ylcarbonylamino)-ethyl]-phenoxy}-2-methylpropionic acid from ethyl 2-{4-[2-(thien-2-ylcarbonylamino)-ethyl]-phenoxy}-2-methylpropionate (see Example 3e); yield 78% of theory; m.p. 135°–137°C. (after recrystallization from ethyl acetateligroin);

4-(1,3-dimethylpyrazol-5-ylcarbonylaminomethyl)-phenoxyacetic acid from ethyl 4-(1,3-dimethylpyrazol-5-ylcarbonylaminomethyl)-phenoxyacetate (see Example 1b); yield 65% of theory; m.p. 188°–190°C., after recrystallization from isopropanol;

2-[4-(1,3-dimethylpyrazol-5-ylcarbonylaminomethyl)-phenoxy]-2-methylpropionic acid from ethyl 2-[4-(1,3-dimethylpyrazol-5-ylcarbonylamino-methyl)-phenoxy]-2-methylpropionate (see Example 3b) yield 71% of theory; m.p. 132°–135°C., after recrystallization from methanolwater;

4-[2-(1,3-dimethylpyrazol-5-ylcarbonylamino)-ethyl]-phenoxyacetic acid from ethyl 4-[2-(1,3-dimethylpyrazol-5-ylcarbonylamino)-ethyl]-phenoxyacetate (see Example 2b); yield 81% of theory; m.p. 205°–206°C., after recrystallization from ethanol;

2-{4-[2-(1,3-dimethylpyrazol-5-ylcarbonylamino)-ethyl]-phenoxy}-2-methylpropionic acid from ethyl 2-{4-[2-(1,3-dimethylpyrazol-5-ylcarbonylamino)-ethyl]-phenoxy}-2-methylpropionate (see Example 3f); yield 67% of theory; m.p. 148°–149°C., after recrystallization from isopropanol;

4-(thiazol-5-ylcarbonylaminomethyl)-phenoxyacetic acid from ethyl 4-(thiazol-5-ylcarbonylaminomethyl)-phenoxyacetate (see Example 4); yield 71% of theory; m.p. 207°–208°C., after recrystallization from ethanolmethanol;

2-[4-(thiazol-5-ylaminomethyl)-phenoxy]-2-methylpropionic acid from ethyl 2-[4-(thiazol-5-ylaminomethyl)-phenoxy]-2-methylpropionate (see Example 7); yield 86% of theory; m.p. 92°C., after recrystallization from water-isopropanol;

4-[2-(thiazol-5-ylcarbonylamino)-ethyl]-phenoxyacetic acid from ethyl 4-[2-(thiazol-5-ylcarbonylamino)-ethyl]-phenoxyacetate (see Example 5); yield 76% of theory; m.p. 186°–188°C., after recrystallization from ethanol;

2-{4-[2-(thiazol-5-ylcarbonylamino)-ethyl]-phenoxy}-2-methylpropionic acid from ethyl 2-{4-[2-(thiazol-5-ylcarbonylamino)-ethyl]-phenoxy}-2-methylpropionate (see Example 6); yield 90% of theory; m.p. 154°–156°C., after recrystallization from ethyl acetate-ligroin;

4-(3-methylpyrazol-5-ylcarbonylaminomethyl)-phenoxyacetic acid from ethyl 4-(3-methylpyrazol-5-ylcarbonylaminomethyl)-phenoxyacetate (see Example 8); yield 70% of theory; m.p. 215°–216°C., after recrystallization from methanol;

2-[4-(3-methylpyrazol-5-ylcarbonylaminomethyl)-phenoxy]-2-methylpropionic acid from ethyl 2-[4-(3-methylpyrazol-5-ylcarbonylaminomethyl)-phenoxy]-2-methylpropionate (see Example 9); yield 63% of theory; m.p. 185°–186°C., after recrystallization from ethyl acetate;

4-[2-(3-methylpyrazol-5-ylcarbonylamino)-ethyl]-phenoxyacetic acid from ethyl 4-[2-(3-methylpyrazol-5-ylcarbonylamino)-ethyl]-phenoxyacetate (see Example 8); yield 73% of theory; m.p. 200°–202°C., after recrystallization from isopropanol;

2-{4-(3-methylpyrazol-5-ylcarbonylamino)-ethyl]-phenoxy}-2-methylpropionic acid from ethyl 2-{4-[2-(3-methylpyrazol-5-ylcarbonylamino)-ethyl]-phenoxy -2-methylpropionate (see Example 9); yield 77% of theory; m.p. 128°–130°C., after recrystallization from ethyl acetate;

4-(pyrid-3-ylcarbonylaminomethyl)-phenoxyacetic acid from ethyl 4-(pyrid-3-ylcarbonylaminomethyl)-phenoxyacetate (see Example 4); yield 98% of theory; m.p. 239°–240°C.;

2-[4-(pyrid-3-ylcarbonylaminomethyl)-phenoxy]-2-methylpropionic acid from ethyl 2-[4-(pyrid-3-ylcarbonylaminomethyl)-phenoxy]-2-methylpropionate (see Example 3c); yield 79% of theory; m.p. 169°–170°C., after recrystallization from isopropanol;

4-[2-(pyrid-3-ylcarbonylamino)-ethyl]-phenoxyacetic acid from ethyl 4-[2-(pyrid-3-ylcarbonylamino)-ethyl]-phenoxyacetate (see Example 5); yield 82% of theory; m.p. 189°–191°C., after recrystallization from ethanol;

2-{4-[2-(pyrid-3-ylcarbonylamino)-ethyl]-phenoxy}-2-methylpropionic acid from ethyl 2-{4-[2-(pyrid-3-ylcarbonylamino)-ethyl]-phenoxy}-2-methylpropionate (see Example 3g); yield 82% of theory; m.p. 80°–81°C., after recrystallization from from water; 4-(4-methoxyindol-2-ylcarbonylaminomethyl)-phenoxyacetic acid from ethyl 4-(5-methoxyindol-2-ylcarbonylaminomethyl)-phenoxyacetate (see Example 10d); yield 66% of theory; crystallized from isopropanol with one mole of alcohol of crystallization; m.p. 89°C.;

2-(4-(5-methoxyindol-2-ylcarbonylaminomethyl)-phenoxy]-2-methylpropionic acid from ethyl 2-[4-(5-methoxyindol-2-ylcarbonylaminomethyl)-phenoxy]-2-methylpropionate (see Example 10c); yield 91% of theory; crystallized from isopropanol with one mole of alcohol of crystallization; m.p. 166°– 168°C.;

4-[2-(5-methoxyindol-2-ylcarbonylamino)-ethyl]-phenoxy-acetic acid from ethyl 4-[2-(5-methoxyindol-2-ylcarbonylamino)-ethyl]-phenoxyacetate (see Example 10a); yield 75% of theory; m.p. 202°– 204°C., after recrystallization from methanol-water;

2-{4-[2-(5-methoxyindol-2-ylcarbonylamino)-ethyl]-phenoxy}-2-methylpropionic acid from ethyl 2-{4-[2-(55-methoxyindol-2-ylcarbonylamino)-ethyl]-phenoxy}-2-methylpropionate (see Example 10); yield 74% of theory; m.p. 198°– 200°C., after recrystallization from isopropanol;

2-{4-[2-(5-chlorindol-2-ylcarbonylamino)-ethyl]-phenoxy}-2-methylpropionic acid from ethyl 2-{4-[2-(5-chloroindol-2-ylcarbonylamino)-ethyl]-phenoxy}-2-methylpropionate (see Example 10b); yield 71% of theory; m.p. 217°– 218°C., after recrystallization from methanolwater.

EXAMPLE 12

The following compounds were prepared in a manner analogous to that described in Example 6;

a. Ethyl 2-{4-[2-(5-chlorothien-2-ylcarbonylamino)-ethyl]-phenoxy}-2-methylpropionate from ethyl 2-[4-(2-aminoethyl)-phenoxy]-2-methylpropionate and 5-chlorothien-2-ylcarbonyl chloride; yield 64% of theory; m.p. 90°– 91°C., after recrystallization from methanol;

b. Ethyl 2-{4-[2-93-methoxyethoxythien-2-ylcarbonylamino)-ethyl]-phenoxy}-2-methylpropionate from ethyl 2-[4-(2-aminoethyl)-phenoxy]-2-methylpropionate and 3-methoxyethoxythien-2-ylcarbonyl chloride; yield 91% of theory; pale yellow oil;

c. Ethyl 2-{ 4-[2-(6-chloropyrid-3-ylcarbonylamino)-ethyl]-phenoxy}-2-methylpropionate from ethyl 2-[4-(2-aminoethyl)-phenoxy]-2-methylpropionate and 6-chloronicotinoyl chloride; yield 89% of theory; m.p. 103°C., after recrystallization from acetone;

d. Ethyl 2-{4-[2-(6-methylpyrid-2-ylcarbonylamino)-ethyl]-phenoxy}-2-methylpropionate from ethyl 2[4-(2-aminoethyl)-phenoxy]-2-methylpropionate and 6-methylpyrid-3-ylcarbonyl chloride; yield 70% of theory; pale yellow oil.

EXAMPLE 13

The following compounds were obtained in a manner analogous to that described in Example 10:

a. Ethyl 2-{4-[2-(indol-2-ylcarbonylamino)-ethyl]-phenoxy } -2-methylpropionate from ethyl 2-[4-(2-aminoethyl)-phenoxy]-2-methylpropionate and indole-2-carboxylic acid; yield 79% of theory; m.p. 141°–143°C., after recrystallization from ethyl acetate;

b. Ethyl 2-{4[2-(3-methoxythien-2-ylcarbonylamino)-ethyl]-phenoxy}-2-methylpropionate from ethyl 2-[4-(2-aminoethyl)-phenoxy]-2-methylpropionate and 3-methoxythiophene-2-carboxylic acid; yield 67% of theory; pale yellow oil.

EXAMPLE 14

Preparation of Ethyl 2-{4-[2-(thien-2-ylcarbonylamino)-ethyl]-phenoxy}-2-methylpropionate 2.6 g. (0.02 mol) thiophene-2-carboxylic acid were dissolved in 25 ml. anhydrous tetrahydrofuran and successively mixed, while stirring at −10°C., with 3.2 ml. (0.023 mol) triethylamine and 2.2 ml. (0.023 mol) ethyl chloroformate. The reaction mixture was then further stirred for 15 minutes, whereafter 5.0 g. (0.02 mol) ethyl 2-[4-(2-aminoethyl)-phenoxy]-2-methylpropionate were added thereto and stirring continued for a further 10 hours at ambient temperature. The solvent was evaporated off in a vacuum and the residue was digested with water, filtered off and thoroughly washed with water. After drying, the product was recrystallized from ethyl acetate. There were obtained 4.8 g. (66% of theory) ethyl 2-{4-[2-(thien-2-ylcarbonylamino)-ethyl]-phenoxy}-2-methylpropionate; m.p. 88°– 89°C.

The following compounds were prepared in an analogous manner;

a. Ethyl 2-{4-[2-(3-methoxymethoxythien-2-ylcarbonylamino)-ethyl]-phenoxy}-2-methylpropionate from ethyl 2-[4-(2-aminoethyl)-phenoxy]-2-methylpropionate and 3-methoxymethoxy-thiophene-2-carboxylic acid; yield 51% of theory; m.p. 69°– 71°C., after recrystallization from ligroin-ethyl acetate;

b. Ethyl 2-{4-[2-(quinolin-2-ylcarbonylamino)-ethyl -phenoxy}-2-methylpropionate from ethyl 21[4-(2-aminoethyl)-phenoxy]-2-methylpropionate and quinoline-2-carboxylic acid; yield 63% of theory; pale yellow oil;

c. Ethyl 2-{4-[2-(7,8-trimethylenequinolin-3-ylcarbonylamino)-ethyl]-phenoxy}-2-methylpropionate from ethyl 2-[4(2-aminoethyl)-phenoxy]-2-methylpropionate and 7,8-trimethylenequinoline-3-carboxylic acid; yield 76% of theory; m.p. 106°– 106.5°C., after recrystallization from isopropanolligroin.

EXAMPLE 15

The following compounds were prepared in a manner analogous to that described in Example 11:

a. 2-{4-[2-(indol-2-ylcarbonylamino)-ethyl]-phenoxy}-2-methylpropionic acid from ethyl 2-{4-[2-(indol-2-ylcarbonylamino)-ethyl]-phenoxy}-2-methylpropionate (see Example 13a); yield 78% of theory; m.p. 186°– 188°C., after recrystallization from ethyl acetate;

b. 2-{4-[2-(3-Methoxythien-2-ylcarbonylamino)-ethyl]-phenoxy } -2-methylpropionic acid from ethyl 2-{4-[2-(3-methoxythien-2-ylcarbonylamino)-ethyl]-phenoxy } -2-methylpropionate (see Example 13b); yield 87% of theory; m.p. 93°– 96°C., after recrystallization from ligroin-ethyl acetate;

c. 2-{4-[2-(3-Methoxymethoxythien-2-ylcarbonylamino)-ethyl]-phenoxy } -2-methylpropionic acid from ethyl 2-{4-[2-(3-methoxymethoxythien-2-ylcarbonylamino)-ethyl]-phenoxy}-2-methylpropionate (see Example 14a); yield 78% of theory; m.p. 110°– 112°C., after recrystallization from ethyl acetate-ligroin;

d. 2-{4-[2-(5-Chlorothien-2-ylcarbonylamino)-ethyl]-phenoxy}-2-methylpropionic acid from ethyl 2-{4-[2-(5-chlorothien-2-ylcarbonylamino)-ethyl]-phenoxy}-2-methylpropionate (see Example 12a); yield 95% of theory; m.p. 173°C., after recrystallization from water;

e. 2-{4-[2-(6-Chloropyrid-3-ylcarbonylamino)-ethyl]-phenoxy}-2-methylpropionic acid from ethyl 2-{4-[2-(6-chloropyrid-3-ylcarbonylamino)-ethyl]-phenoxy}-2-methylpropionate (see Example 12c); yield 81% of theory; m.p. 150°–150.5°C., after recrystallization from methanol;

f. 2-{4-[2-(6-Methylpyrid-2-ylcarbonylamino)-ethyl]-phenoxy}-2-methylpropionic acid from ethyl 2-{4-[2-(6-methylpyrid-2-ylcarbonylamino)-ethyl]-phenoxy}-2-methylpropionate (see Example 12d); yield 88% of theory; m.p. 122°–122.5°C., after recrystallization from acetone;

g. 2-{4-[2-(Quinolin-2-ylcarbonylamino)-ethyl]-phenoxy}-2-methylpropionic acid from ethyl 2-{4-[2-(quinolin-2-ylcarbonylamino)-ethyl]-phenoxy}-2-methylpropionate (see Example 14b); yield 66% of theory; m.p. 159°–160°C., after recrystallization from acetone;

h. 2-{4-[2-(7,8-Trimethylenequinolin-3-ylcarbonylamino)-ethyl]-phenoxy}-2-methylpropionic acid from ethyl 2-{4-[2-(7,8-trimethylenequinolin-3-ylcarbonylamino)-ethyl]-phenoxy}-2-methylpropionate (see Example 14c); yield 100% of theory; m.p. 223°–224°C., after recrystallization from isopropanol.

As noted above, the new compounds of the present invention are useful as chemotherapeutants, particularly as agents for depressing the serum lipid level, without undesired side effects occurring simultaneously. Thus, the new compounds are effective therapeutic agents in the treatment of atherosclerosis, as stated hereinabove.

The ability of the instant compounds to lower the serum lipid level and the cholesterol level is demonstrated by the following illustrative experiments:

Male rats of a weight of about 200 g (10 animals per substance in each case) were given for six days a powdered fodder of the company Intermast GmbH, Bockum-Hövel (manufacturer: Plange, Soest), which contained admixed thereto the substances to be tested in the concentrations listed below. On the seventh day, without interruption of the feeding of the substances, the animals were killed by neck blow and bled white. In the serum, the triglycerides were determined enzymatically according to Kreutz and Eggstein (Klin. Wschr. 40, 363;1962; 44,262/1966) in the modification according to Schmidt et al. (Z. Klin. Chem. and Klin. Biochem. 6, 156/1968) and cholesterol was determined colorimetrically according to Watson (Klin. Chim. Acta 5, 637/1960).

The results are set forth in the Table below:

| Test substance* | concentr. in the fodder in % | Reduction in % Triglycerides | Reduction in % Cholesterol |
|---|---|---|---|
| 2-(p-chlorophenoxy)-2-methyl-propionic acid ethyl ester (Clofibrat = Regelan (Comparison Cmpd. | 0.056 | 21 | 0 |
| 4-(1,3-dimethylpyrazol-5-ylcarbonylaminomethyl)phenoxyacetic acid [11] | 0.05 | 21 | 13 |
| 4-[2-(thiazol-5-ylcarbonylamino)-ethyl]-phenoxyacetic acid [11] | 0.05 | 17 | 20 |
| 4-(3-methylpyrazol-5-ylcarbonylaminomethyl)-phenoxyacetic acid [11] | 0.05 | 0 | 24 |
| 4-[2-(3-methylpyrazol-5-ylcarbonylamino)-ethyl]-phenoxyacetic acid [11] | 0.05 | 22 | 20 |
| 2-{4-[2-(3-methylpyrazol-5-ylcarbonylamino)-ethyl]-phenoxy}-2-methyl propionic acid [11] | 0.05 | 16 | 14 |
| 4-[2-(pyrid-3-ylcarbonylamino)-ethyl]-phenoxy-acetic acid [11] | 0.05 | 21 | 25 |
| 2-{4-[2-(pyrid-3-ylcarbonylamino)-ethyl]-phenoxy}-2-methylpropionic acid [11] | 0.05 | 8 | 23 |
| 4-[2-(5-methoxyindol-2-ylcarbonylamino)-ethyl]-phenoxy-acetic acid [11] | 0.05 | 19 | 19 |
| 2-{4-[2-(5-chloroindol-2-ylcarbonylamino)-ethyl]-phenoxy}-2-methyl propionic acid [11] | 0.025 | 39 | 21 |
| Ethyl-4-(thiazol-5-yl-carbonylaminomethyl)-phenoxyacetate [4] | 0.05 | 13 | 23 |

*The numbers in brackets are the numbers of the preparative examples corresponding to each compound tested.

From the above it can be seen that the new substances are superior to the known anti-hyperlipidaemic, Clofibrat, in particular with respect to cholesterol-reducing action.

The novel compounds may be administered by themselves or in conjunction with carriers which are pharmacologically acceptable, either active or inert. The dosage units are similar to those of the heretofore known anti-cholesterol agents, e.g. about 1 to 2 grams per day for an adult or about 30 mg/kg per day although higher or lower dosages can be used. Rather than a single dose it is preferable if the compounds are administered in the course of a day, i.e. about four applications of 500 mg. each at spaced time intervals or 8 of about 250 mg. each. A convenient form of administration is in a gelatin capsule.

It will be appreciated that the instant specification and examples are set forth by way of illustration and not limitation, and that various modifications and changes may be made without departing from the spirit and scope of the present invention.

What is claim is:

1. Phenoxyalkyl-carboxylic acid compounds of the formula

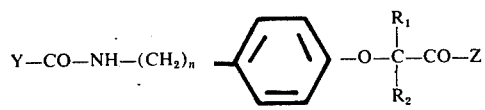

wherein $R_1$ and $R_2$ are individually selected from hydrogen and methyl;

n is 1 or 2;

Z is hydroxyl or alkoxy; and

Y is 2-indolyl which may be optionally substituted on the benzene nucleus by halogen, lower alkyl or alkoxy;

and the pharmacologically compatible salts thereof.

2. Phenoxyalkyl-carboxylic acid compound as claimed in claim 1, wherein $R_1$ is hydrogen.

3. Phenoxyalkyl-carboxylic acid compound as claimed in claim 1, wherein $R_1$ is methyl.

4. Phenoxyalkyl-carboxylic acid compound as claimed in claim 1, wherein $R_2$ is hydrogen.

5. Phenoxyalkyl-carboxylic acid compound as claimed in claim 1, wherein $R_2$ is methyl.

6. Phenoxyalkyl-carboxylic acid compound as claimed in claim 1, wherein $n$ is 1.

7. Phenoxyalkyl-carboxylic acid compound as claimed in claim 1, wherein $n$ is 2.

8. Phenoxyalkyl-carboxylic acid compound as claimed in claim 1, wherein Z is hydroxyl.

9. Phenoxyalkyl-carboxylic acid compound as claimed in claim 1, wherein Z is alkoxy.

10. Phenoxyalkyl-carboxylic acid compound as claimed in claim 1, designated 2-{4-[2-(5-chloroindol-2-ylcarbonylamino)-ethyl]-phenoxy}-2-methylpropionic acid.

* * * * *